United States Patent [19]

Brown

[11] Patent Number: 4,474,189

[45] Date of Patent: Oct. 2, 1984

[54] APPARATUS INCORPORATING A SPLASHED-LIQUID, NORMALLY-CLOSED CHECK VALVE

[76] Inventor: Harley D. Brown, P.O. Box 844, Bedford, Ind. 47421

[21] Appl. No.: 286,237

[22] Filed: Jul. 23, 1981

[51] Int. Cl.³ .......................................... F16K 15/00
[52] U.S. Cl. .................... 137/210; 137/351; 137/513.3; 137/540; 137/541; 137/590; 55/385 C; 55/417
[58] Field of Search .............. 137/210, 355, 592, 351, 137/541, 399, 590; 55/385 C, 417

[56] References Cited

U.S. PATENT DOCUMENTS 2,217,582 10/1940 White .................................. 137/590
2,460,159 1/1949 White .................................. 137/351

Primary Examiner—Martin P. Schwadron
Assistant Examiner—Sheri Novack
Attorney, Agent, or Firm—Woodard, Weikart, Emhardt & Naughton

[57] ABSTRACT

An apparatus incorporating a normally-closed check valve mounted on the inlet end of a vapor withdrawal conduit and located in the upper vapor portion of a partially filled pressurized LP gas tank on a recreational vehicle or the like. The outlet end of the vapor withdrawal conduit extends to a point lower and exterior to the volatile liquid container and is connected to a control valve to stop the flow of fluid. As the control valve is opened to allow fluid to pass. Then the pressure in the vapor withdrawal conduit drops. The check valve opens and allows gases from the volatile liquid container to pass down the tube. After the control valve is closed, the pressure in the vapor withdrawal conduit increases till it equals the pressure in the container. The check valve closes and stops the flow of fluid.

When the apparatus is used in a movable mode, such as on a vehicle, the check valve is closed, preventing the volatile liquid contained in the container from being splashed into the vapor withdrawal conduit. This prevents possible damage to gas consuming devices by liquid entering the vapor withdrawal conduit and in turn the gas consuming device when the control valve is opened.

6 Claims, 7 Drawing Figures

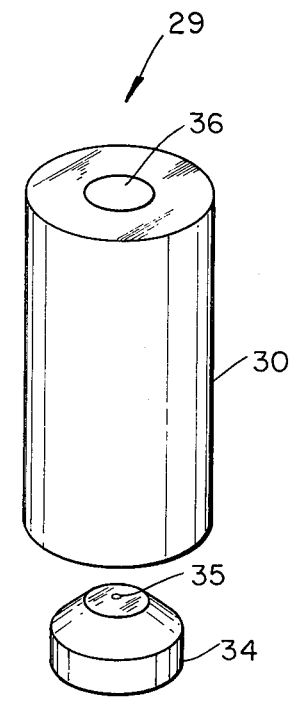
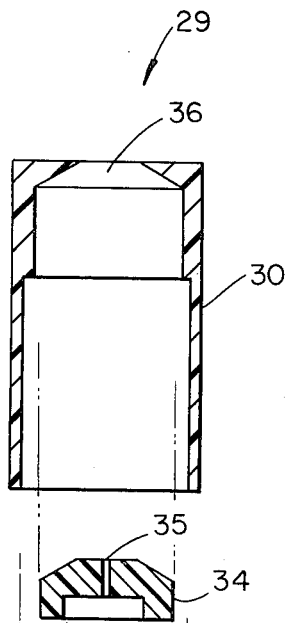
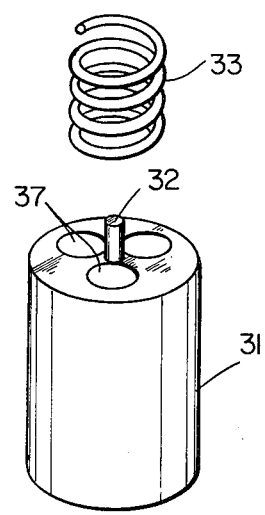
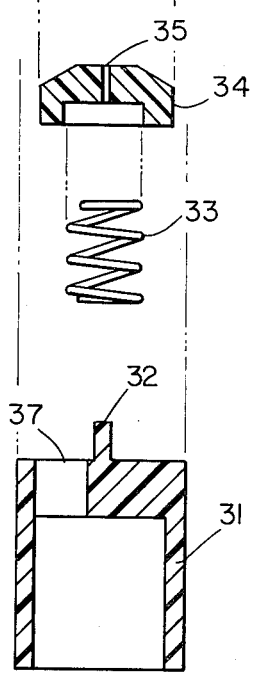
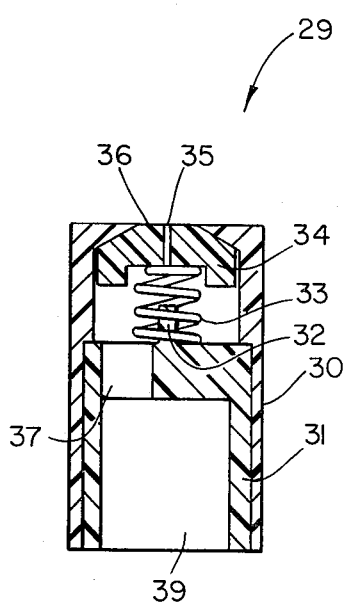
Fig. 5   Fig. 6   Fig. 7

APPARATUS INCORPORATING A SPLASHED-LIQUID, NORMALLY-CLOSED CHECK VALVE

BACKGROUND OF THE INVENTION

The present invention relates to a device for protecting against liquids being splashed into a vapor-only-withdrawal conduit of an LP gas tank or the like used on a recreational vehicle or the like. The present invention also relates to a check valve.

Many recreational vehicles and the like have LP gas tanks mountable thereon for use in providing a power source for appliances. When the vehicle moves, the LP gas, which is under pressure in the tanks, is shaken around causing the liquid component of the LP gas to splash into the liquid withdrawal conduit of the tank. The problem that results is, when the liquid is dispensed out of the tanks along with the desired gas, appliances are caused to malfunction and regulators are damaged and frozen. Consequently, it is desirable that LP gas tanks be provided with means for preventing the liquid component of the LP gas from being dispensed along with the gas component thereof.

A check valve has in the past been designed in such a way so as to have a cavity or depression in the inlet end of the check valve as typified by the patent to Wynn, U.S. Pat. No. 4,129,145. Devices such as Wynn allow liquid to be trapped in the inlet cavity. When the valve is opened to allow a gas to pass, the liquid is passed along as well. Non-gaseous liquid in the vapor withdrawal conduit can cause regulator damage, regulator freeze-ups and appliance malfunction.

Some valves have also been designed as typified by the patent to Behle, U.S. Pat. No. 4,114,636 with an air inlet and outlet valve for a tank. Disclosed is an upper ball type valve which allows air to enter or leave the tank through the conduit when the ball is in an unseated position. Liquid in the tank causes the ball to move into a seated position blocking the entrance to the conduit.

Other possibly relevant references are: Kramer, U.S. Pat. Nos. 1,614,561; Scott, 2,301,821; Buttner et al., 2,405,998; St. Clair, 2,638,924; Davis, 3,335,751; Howard, 3,736,956; Fanshier, 3,794,077; Stover, 3,822,028; Behle, 4,114,636; Wynn, 4,129,145; Firestone, 4,131,129; Smith, 3,106,956; Ward, 1,947,366.

SUMMARY OF THE INVENTION

The present invention allows a volatile liquid to be withdrawn as a vapor from a pressurized container and guards against the possibility that liquid would be splashed into the vapor withdrawal conduit. The present invention leaves no place for splashed liquid to collect, so the liquid returns to the container, and only the vapor is passed. This invention provides simple and inexpensive protection against liquid splash.

The check valve is preferably comprised of a biasing device positioned on the shaft end of a plunger, seating the plunger and seat washer against the vapor portholes inside the valve body. In one embodiment of the invention, the check valve is mounted inside the volatile liquid container on the inlet end of a vapor withdrawal conduit. A control valve is mounted on the outlet end of the vapor withdrawal conduit. As vapor is needed the control valve is opened, the pressure in the vapor withdrawal conduit drops, compressing the biasing device, unseating the plunger and unblocking vapor portholes allowing the vapor to pass. When the vapor is no longer needed, the control valve is closed causing the pressure on both sides of the check valve to equalize so that the device returns the plunger to the normally closed position to seat against the valve body, blocking the vapor portholes. This stops vapor from continuing to pass and prevents liquid from being splashed into the vapor withdrawal conduit.

BRIEF DESCRIPTION OF THE DRAWINGS

FIG. 5 is an exploded perspective view of a preferred embodiment of a check valve forming a part of the structure of FIGS. 1 and 2.

FIG. 6 is an axial section of the structure of FIG. 5.

FIG. 7 is a view similar to FIG. 6 of the structure of FIGS. 5 and 6 but showing the structure in assembled condition.

DESCRIPTION OF THE PREFERRED EMBODIMENT

Figure 1:
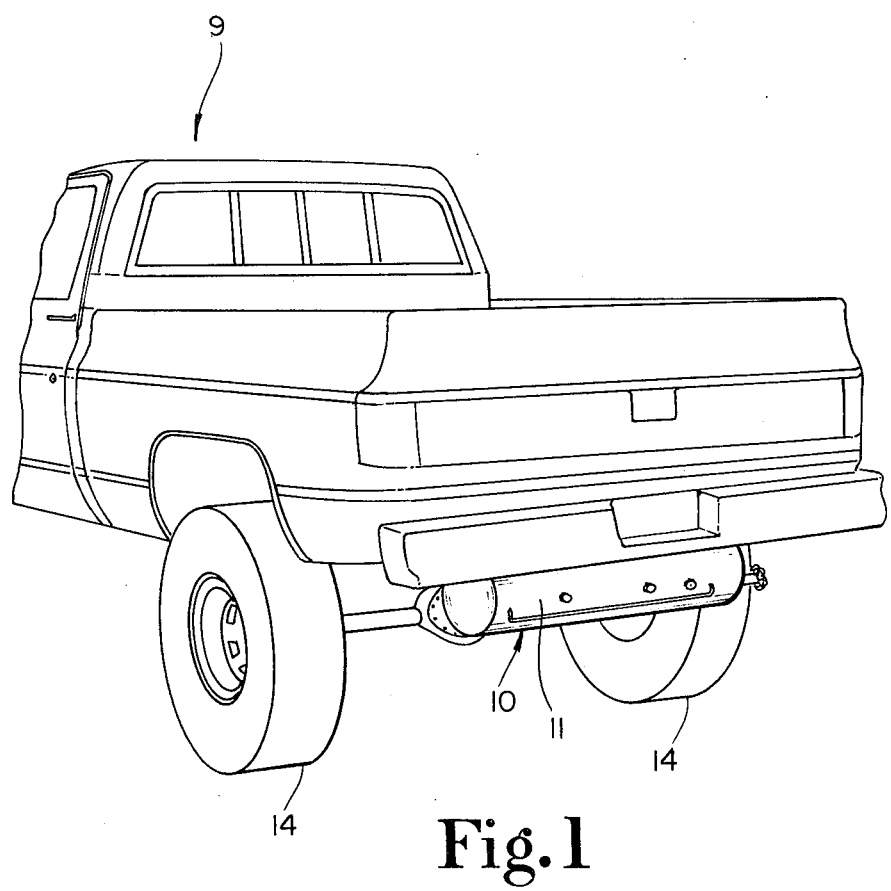
FIG. 1 is a perspective view of a vehicle embodying the present invention.
Figure 2:
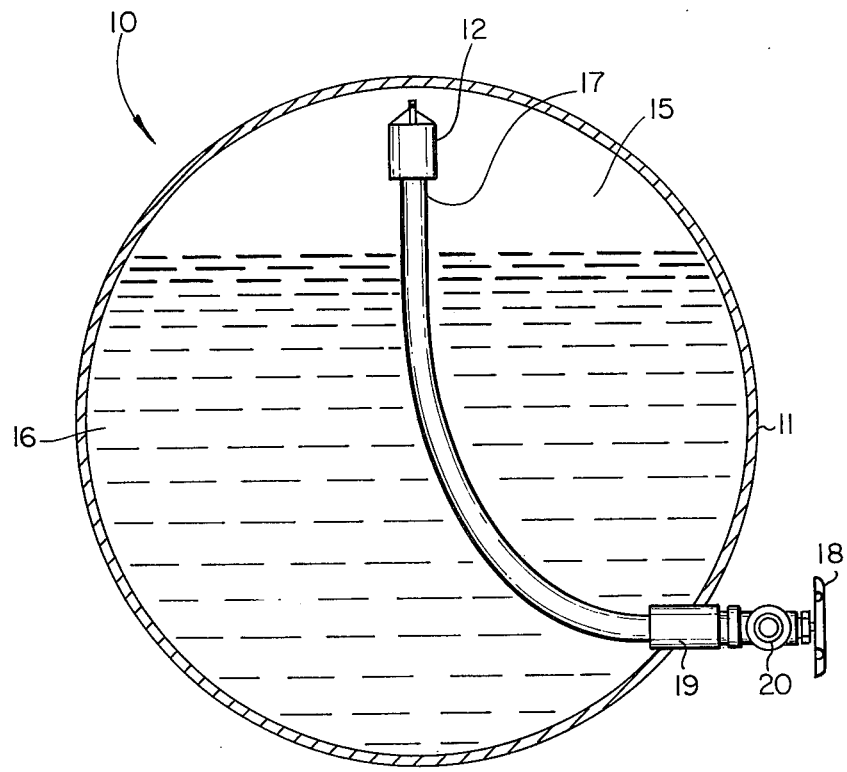
FIG. 2 is a cross section of a tank forming a part of the structure of FIG. 1.

Referring to FIG. 1, there is illustrated a vehicle 9 including the LP gas tank 10 comprised of a tank or container 11 which contains a check valve 12. The tank or container 11 is attached by suitable support brackets (not shown) to vehicle 9 which is supported by and afforded movement by wheels 14 in a conventional manner. Check valve 12 is located in the gaseous upper region 15 of container 11, and is mounted on the inlet end of the vapor withdrawal conduit 17. The vapor withdrawal conduit 17 extends from its inlet end in the region 15 down through the volatile liquid 16 to a point lower than the top level of the volatile liquid 16 to the exterior of the container 11 to the inlet side 19 of a control valve 18. The control valve 18 has an inlet 19 and an outlet 20.

A preferred embodiment 29 of the check valve 12 is illustrated in detail in FIGS. 5, 6, & 7. Check valve 29 comprises a tubular body 30 with a tubular insert 31 mounted inside body 30 by a friction fit. A plunger head 34 is biased between body 30 and insert 31 by a compression spring 33 received around insert shaft 32. The spring 33 is retained within plunger head 34 and acts between insert 31 and head 34. A bleed hole 35 is located in the plunger head 34, connecting the inside of body 30 to the outside of body 30. This connection is continuous even though the valve 29 is closed. The tubular insert 31 has a bore 39 into which projects withdrawal conduit 17 for mouting the embodiment 29. When so mounted the withdrawal conduit communicates with three bores 37 extending through the insert 31 from the bore 39 to the upper surface of the insert.

Figure 3:
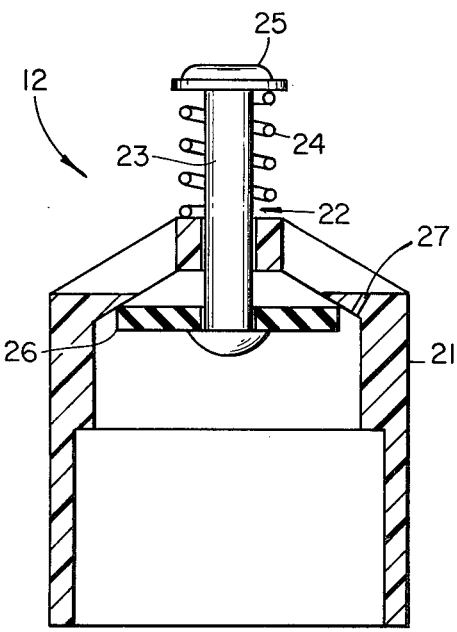
FIG. 3 is an axial cross sectional view of one embodiment of a check valve forming a part of the structure of FIGS. 1 and 2.

The check valve 12 is illustrated in more detail in FIG. 3 as including a tubular body 21 with a plunger 22 mounted on the inside of body 21 and a portion of plunger shaft 23 extending outside of the body 21. Plunger 22 is biased by a compression spring 24 received around the plunger shaft 23. The spring 24 is retained on the plunger by a hand 25 at the outboard end of the plunger and also acts against the body 21.

Inside the body 21, the plunger 22 has a seat washer 26 mounted on the end of the plunger shaft 23. A bleed hole 27 is located on inlet side of the body 21, connecting the inside of the body 21 to the outside of the body 21. This connection is continuous even though the valve 12 is closed.

The container 11 is filled with a volatile liquid with the gas 15 in the upper portion and the liquid 16 in the lower portion. When the control valve 18 is opened, the pressure in vapor withdrawal conduit 17 decreases. Plunger 22 and seat washer 26 is then unseated, unblocking openings 28 on the body 21. This allows the vapor 15 in the upper portion of container 11 to enter through openings 28 and pass through body 21, vapor withdrawal conduit 17, and through control valve 18 to the gas consuming device. As is shown in FIG. 3, seat washer 26 is substantially coplanar with the end surface 40 of the inlet of body 21 when check valve 12 is closed. This construction eliminates cavities or depressions in the inlet end of the check valve and thus prevents the accumulation of a substantial amount of splashed liquid therein when the check valve is closed. By preventing such liquid accumulation the present invention protects regulators and appliances which can be damaged by such liquid entering conduit 17 along with vapor 15 upon opening of control valve 18.

The preferred embodiment 29 of the check valve operates in the same fashion above described. Plunger head 34 is unseated when the pressure in the vapor withdrawal conduit 17 decreases. Vapor 15 is allowed to enter opening 36 in body 30 and pass through openings 36, and 37, bore 39 and vapor withdrawal conduit 17 in a similar manner as above. When the control valve 18 is closed, the pressure in the vapor withdrawal conduit 17 increases causing the plunger head 34 returns to its normally closed position, seated against body 30. A bleed hole 35 is located in the plunger head 34 to prevent the check valve 29 from being blown off of the vapor withdrawal conduit 17 when the pressure in the container 11 is less than the pressure in the vapor withdrawal conduit 17. On some occasions, this might happen if there is a leak in the container 11.

This apparatus 10 guards against the possibility of damage to the vapor consuming device from liquid being splashed into the vapor withdrawal conduit 17. When the apparatus 10 is used in a movable mode, the liquid 16 inside container 11, is unable to be splashed into the vapor withdrawal conduit 17 because plunger head 34 blocks opening 36. This prevents liquid 16 from being splashed into the vapor withdrawal conduit 17. Liquid cannot accumulate in the inlet of check valve 29 because plunger head 34 is substantially coplanar with the end surface 38 of the inlet of body 30 when check valve 29 is closed. Thus regulators and appliances which can be damaged by splashed liquid are protected.

Figure 4:
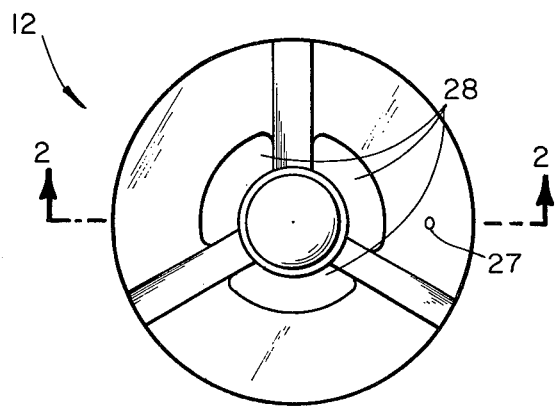
FIG. 4 is a top plan view of the check valve of FIG. 3.

Referring to FIGS. 3 and 4, similar to the preferred embodiment, when control valve 18 is closed the pressure in the vapor withdrawal conduit 17 increases causing plunger 22 and seat washer 26 in check valve 12 to return to its normally closed position, seated against the body 21. The openings 28 are then blocked by plunger 22, preventing liquid being splashed into the vapor withdrawal conduit 17. A bleed hole 27 is located in body 21 to prevent valve 12 from being blown off of the vapor withdrawal conduit 17 when the pressure in the container 11 is less than the pressure in the vapor withdrawal conduit 17.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A combination for dispensing gas emanating from volatile liquids comprising:
   (a) a container having a hollow interior including an upper portion and a lower portion, said container being adapted to receive a gaseous and liquid fluid with the gaseous component thereof in said upper portion and the liquid component thereof in said lower portion;
   (b) a control valve arranged to stop the flow of gas out of said container; and
   (c) means, including a normally closed check valve positioned with its inlet in said upper portion of said container above said volatile liquid and exposed to the gasses above said liquid, said normally closed valve being oriented so that it will open when the pressure at its inlet is higher than at its outlet, and a conduit connecting the outlet of said check valve to said control valve, for restricting fluid flow through said control valve to said gaseous component only, in which said normally closed check valve includes:
   (1) a check valve body having a gas inlet, a seating surface portion and an inlet end surface portion, and a passageway communicating between said gas inlet and said seating surface;
   (2) a check valve washer dimensioned to mate with said seating surface portion of said check valve body; and
   (3) a means for biasing said check valve washer against said seating portion of said check valve body in a normally closed position,
   in which said check valve washer is substantially coplanar with said inlet end surface portion when said check valve is closed whereby an appreciable volume of liquid cannot accumulate in the inlet of said check valve body regardless of the orientation of said check valve body.

2. The combination of claim 1 which additionally includes a vehicle to which said container is affixed.

3. The combination of claim 1 in which said control valve is attached to said container and is positioned below the top level of the liquid in said container.

4. A combination for dispensing gas emanating from volatile liquids comprising:
   (a) a container having a hollow interior including an upper portion and a lower portion, said container being adapted to receive a gaseous and liquid fluid with the gaseous component thereof in said upper portion and the liquid component thereof in said lower portion;
   (b) a control valve arranged to stop the flow of gas out of said container; and
   (c) means, including a normally closed check valve positioned with its inlet in said upper portion of said container above said volatile liquid and exposed to the gases above said liquid, said normally closed valve being oriented so that it will open when the pressure at its inlet is higher than at its outlet, and a conduit connecting the outlet of said check valve to said control valve, for restricting fluid flow through said control valve to said gaseous component only, in which said normally closed check valve includes:
(1) a check valve body having a gas inlet, a seating surface portion and an inlet end surface portion, and a passageway communicating between said gas inlet and said seating surface;
(2) a check valve plunger head dimensioned to mate with said seating surface portion of said check valve body; and
(3) a means for biasing said check valve plunger head against said seating portion of said check valve body in a normally closed position, in which said check valve plunger head is substantially coplanar with said inlet end surface portion when said check valve is closed whereby an appreciable volume of liquid cannot accumulate in the inlet of said check valve body regardless of the orientation of said check valve body.

5. A movable combination for dispensing gasses emanating from volatile liquids comprising:
(a) a container having a top and a bottom;
(b) a normally closed check valve positioned with its inlet in said container near the top of said container, said normally closed check valve being oriented so that it will open when the pressure at its inlet is higher than at its outlet;
(c) a control valve located on the outlet end of said check valve to stop the flow of gas, said control valve being positioned near the bottom of said container;
(d) conduit connecting the outlet of said check valve to said control valve, in which said normally closed check valve includes:
(1) a valve body having a gas inlet, a seating surface portion and an inlet end surface portion, and a passageway communicating between said gas inlet and said seating surface;
(2) a valve seat dimensioned to mate with said seating surface portion of said valve body; and
(3) a tension means for biasing said valve seat against said seating portion of said valve body in a normally closed position, in which said valve seat is substantially coplanar with said inlet end surface portion when said check valve is closed whereby an appreciable volume of liquid cannot accumulate in the inlet of said valve body regardless of the orientation of said valve body.

6. A combination for dispensing gas emanating from volatile liquids comprising:
(a) a container having a hollow interior including an upper portion and a lower portion, said container being adapted to receive a gaseous and liquid fluid with the gaseous component thereof in said upper portion and the liquid component thereof in said lower portion;
(b) a control valve arranged to stop the flow of gas out of said container; and
(c) means, including a normally closed check valve positioned with its inlet in said upper portion of said container above said volatile liquid and exposed to the gases above said liquid, said normally closed valve being oriented so that it will open when the pressure at its inlet is higher than at its outlet, and a conduit connecting the outlet of said check valve to said control valve, for restricting fluid flow through said control valve to said gaseous component only, in which said normally closed check valve includes:
(1) a valve body having a gas inlet, a seating surface portion and an inlet end surface portion, and a passageway communicating between said gas inlet and said seating surface;
(2) a valve seat dimensioned to mate with said seating surface portion of said valve body; and
(3) a tension means for biasing said valve seat against said seating portion of said valve body in a normally closed position, in which said valve seat is substantially coplanar with said inlet end surface portion when said check valve is closed whereby an appreciable volume of liquid cannot accumulate in the inlet of said valve body regardless of the orientation of said valve body.

* * * * *

UNITED STATES PATENT AND TRADEMARK OFFICE
CERTIFICATE OF CORRECTION

PATENT NO. :  4,474,189

DATED      :  October 2, 1984

INVENTOR(S) :  Harley D. Brown

It is certified that error appears in the above-identified patent and that said Letters Patent is hereby corrected as shown below:

Column 2, line 67, change "hand" to --head--.

Signed and Sealed this

Nineteenth Day of March 1985

[SEAL]

Attest:

DONALD J. QUIGG

Attesting Officer        Acting Commissioner of Patents and Trademarks